US012561352B2

(12) United States Patent
Muthusamy et al.

(10) Patent No.: US 12,561,352 B2
(45) Date of Patent: Feb. 24, 2026

(54) OPTIMIZING PUBLICATION AND SUBSCRIPTION EXPRESSIVENESS

(71) Applicant: INTERNATIONAL BUSINESS MACHINES CORPORATION, Armonk, NY (US)

(72) Inventors: Vinod Muthusamy, Austin, TX (US); Vatche Isahagian, Belmont, MA (US); Aleksander Slominski, Riverdale, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/534,442

(22) Filed: Dec. 8, 2023

(65) Prior Publication Data

US 2025/0190457 A1      Jun. 12, 2025

(51) Int. Cl.
| | | |
|---|---|---|
| *G06F 16/00* | (2019.01) | |
| *G06F 16/3329* | (2025.01) | |
| *G06F 16/334* | (2025.01) | |

(52) U.S. Cl.
CPC ...... *G06F 16/3329* (2019.01); *G06F 16/3347* (2019.01)

(58) Field of Classification Search
CPC .......................... G06F 16/3329; G06F 16/3347
See application file for complete search history.

(56) References Cited

U.S. PATENT DOCUMENTS

| | | | | |
|---|---|---|---|---|
| 2005/0154712 A1* | 7/2005 | Branigan | ................. | G06F 9/542 |
| 2008/0196016 A1* | 8/2008 | Todd | ......................... | G06F 9/546 |
| | | | | 717/143 |

| | | | | |
|---|---|---|---|---|
| 2010/0306264 A1* | 12/2010 | Fletcher | .............. | G06F 16/9014 |
| | | | | 707/769 |
| 2014/0081915 A1* | 3/2014 | Chow | ................ | G06Q 30/0207 |
| | | | | 707/627 |
| 2019/0370854 A1* | 12/2019 | Gao | ........................ | H04W 4/21 |

(Continued)

FOREIGN PATENT DOCUMENTS

| | | |
|---|---|---|
| CN | 113377930 B | 11/2021 |
| CN | 115329745 A | 11/2022 |

(Continued)

OTHER PUBLICATIONS

Laredo et al., Build a news-based real-time alert system with Twitter, Amazon SageMaker, and Hugging Face, Amazon Machine Learning, Jul. 15, 2022, 8 pages.
"Middleware 2023", 24th ACM/IFIP International Middleware Conference, retrieved from web https://web.archive.org/web/20230812063107/https://middleware-conf.github.io/2023/, Aug. 12, 2023, 3 pages.

(Continued)

*Primary Examiner* — Syed H Hasan
(74) *Attorney, Agent, or Firm* — CHIP LAW GROUP

(57)      ABSTRACT

A computer product and methodology is provided for optimizing publication and subscription expressiveness. A first computerized subscription presenting a first query for desired information is established. A first computerized publication having first published information is identified. A determination is made whether the first computerized publication matches the first computerized subscription. After determining a match, the first computerized publication is combined with the first computerized subscription as a first data pair. The first data pair is employed to inference a first notification having an expression of the first query's desired information.

16 Claims, 6 Drawing Sheets

(56)                    References Cited

U.S. PATENT DOCUMENTS

| | | | |
|---|---|---|---|
| 2022/0012633 A1* | 1/2022 | Molahalli | ............... H04L 41/50 |
| 2022/0138170 A1* | 5/2022 | Misiewicz | ............. G06N 5/022 |
| | | | 707/737 |
| 2022/0365993 A1 | 11/2022 | Voisin et al. | |
| 2023/0074406 A1 | 3/2023 | Baeuml et al. | |
| 2023/0409414 A1* | 12/2023 | Mansoor | ............. G06F 16/9535 |

FOREIGN PATENT DOCUMENTS

| | | |
|---|---|---|
| CN | 115687576 A | 2/2023 |
| CN | 116303980 | 6/2023 |
| CN | 116561286 A | 8/2023 |
| CN | 116842126 A | 10/2023 |

OTHER PUBLICATIONS

Bommasani et al. "On the Opportunities and Risks of Foundation Models", arXiv preprint arXiv:2108.07258, Aug. 16, 2021, 211 pages.
Lewis et al. "Retrieval-Augmented Generation for Knowledge-Intensive NLP Tasks", Advances in Neural Information Processing Systems, arXiv:2005.11401v1 [cs.CL], May 22, 2020, pp. 9459-9474, vol. 33.
Zhao et al. " Subscription Propagation in Highly-Available Publish/ Subscribe Middleware" In Middleware 2004: ACM/IFIP/Usenix International Middleware Conference, Toronto, Canada, Oct. 18-22, 2004, pp. 274-293.

* cited by examiner

100

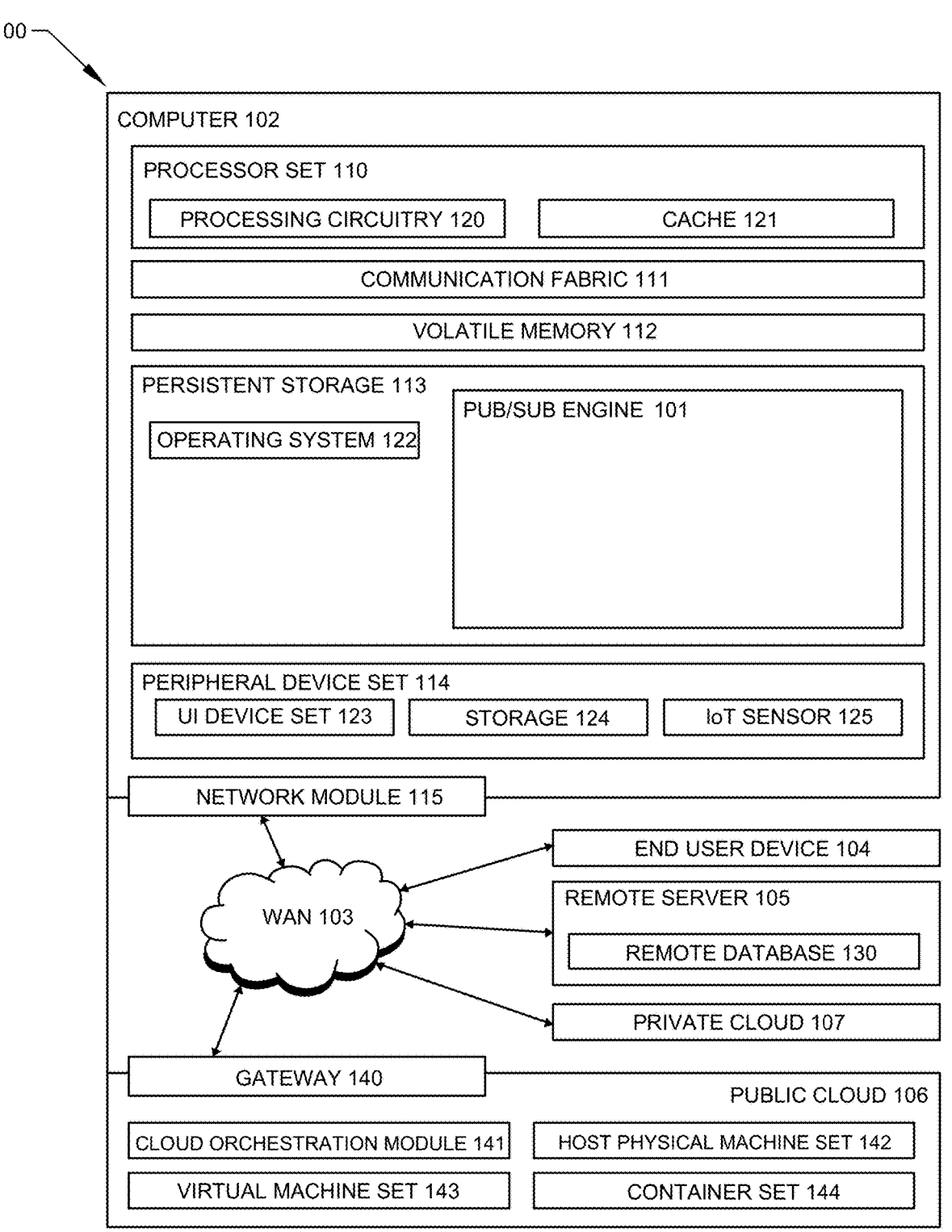

COMPUTER 102

PROCESSOR SET 110

PROCESSING CIRCUITRY 120    CACHE 121

COMMUNICATION FABRIC 111

VOLATILE MEMORY 112

PERSISTENT STORAGE 113

OPERATING SYSTEM 122

PUB/SUB ENGINE 101

PERIPHERAL DEVICE SET 114

UI DEVICE SET 123    STORAGE 124    IoT SENSOR 125

NETWORK MODULE 115

WAN 103

END USER DEVICE 104

REMOTE SERVER 105

REMOTE DATABASE 130

PRIVATE CLOUD 107

GATEWAY 140

PUBLIC CLOUD 106

CLOUD ORCHESTRATION MODULE 141    HOST PHYSICAL MACHINE SET 142

VIRTUAL MACHINE SET 143    CONTAINER SET 144

FIG. 1

| Subscription/Query | Matching Publication Excerpt | Notification |
|---|---|---|
| 152<sub>b</sub> Who has the most world series wins in mlb history | 156<sub>b-d</sub> As of 2017, the World Series has been contested 113 times…in the American League, the New York Yankees have played in 40 World Series and won 27…In the National League…the Brooklyn/Los Angeles Dodgers have appeared in 19 and won 6…. | 162<sub>b</sub> New York Yankees "Sports_Illustrated_05-2023" |
| 152<sub>c</sub> Who has won the most baseball world series | | 162<sub>c</sub> New York Yankees "Sports_Illustrated_05-2023" |
| 152<sub>d</sub> Has the la dodgers ever won a world series | "Sports_Illustrated_05-2023" | 162<sub>d</sub> Yes "Sports_Illustrated_05-2023" |

FIG. 4

| Subscription/Query | Matching Publication Excerpt | Notification |
|---|---|---|
| 152$_e$<br>What are the 2 parks at euro disney | 156$_{e1}$<br>Walt Disney Studios Park, opened on 16 March 2002 celebrating showbusiness, films, and behind-the-scenes shopping, dining, and entertainment....<br><br>"Travel_6-2023"<br><br>156$_{e2}$<br>...encompasses two theme parks, many resort hotels, a shopping, dining, and entertainment complex, and a golf course...Disneyland Park is the original theme park of the complex, opening with the resort on 12 April 1992<br><br>"Adventure_11-2022" | 162$_e$<br>Disneyland Park, opened with the resort on 12 April 1992...Walt Disney Studios Park, opened on 16 March 2002.<br><br>"Travel_6-2023"<br>∩<br>"Adventure_11-2022" |

FIG. 5

OPTIMIZING PUBLICATION AND SUBSCRIPTION EXPRESSIVENESS

BACKGROUND

Technical Field

The present disclosure generally relates to using natural language ("NL") to interact with computer systems, and more particularly but not by way of limitation, to optimizing publication and subscription expressiveness.

Description of the Related Art

Publish/subscribe ("Pub/Sub") systems support a range of expressiveness, including channel-based, topic-based, and content-based paradigms. Such systems involve strictly defined schemas for both publications and subscriptions.

SUMMARY

According to an embodiment of the present disclosure, a computer-implemented method is provided for optimizing publication and subscription expressiveness. The method includes establishing a first computerized subscription presenting a first query for desired information. A first computerized publication can be identified having first published information. A determination can be made whether the first computerized publication matches the first computerized subscription. After the determining step determines a match, the first computerized publication can be combined with the first computerized subscription as a first data pair. The first data pair can be employed for inferencing a first notification having an expression of the first query's desired information.

In one embodiment, a computer program product is provided for optimizing publication and subscription expressiveness. The computer program product includes a computer readable storage medium having program instructions embodied therewith. An execution of the program instructions by a processor causes a computing device to establish a first computerized subscription presenting a first query for desired information. A first computerized publication having first published information can be identified. A determination can be made whether the first computerized publication matches the first computerized subscription. After determining a match, the first computerized publication can be combined with the first computerized subscription as a first data pair. The first data pair can be employed to inference a first notification having an expression of the first query's desired information.

In one embodiment, a computer system is provided for optimizing publication and subscription expressiveness. The computer system includes a processor, a computer-readable memory, a computer-readable tangible storage device, and program instructions stored on the computer-readable storage device for execution by a processor via the computer-readable memory. The computer system is configured to establish a first computerized subscription presenting a first query for desired information. A first computerized publication having first published information can be identified. A determination can be made whether the first computerized publication matches the first computerized subscription. After determining a match, the first computerized publication can be combined with the first computerized subscription as a first data pair. The first data pair can be employed to inference a first notification having an expression of the first query's desired information.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 1 is a functional block diagram of a computer hardware platform for efficient and reliable publication and subscription expressiveness, consistent with illustrative embodiments.

FIG. 4 depicts a set of subscriptions, publications and notifications arising from using the computer system of FIG. 2, consistent with illustrative embodiments.

FIG. 5 is a similar depiction as FIG. 4, consistent with illustrative embodiments.

DETAILED DESCRIPTION

Figure 2:
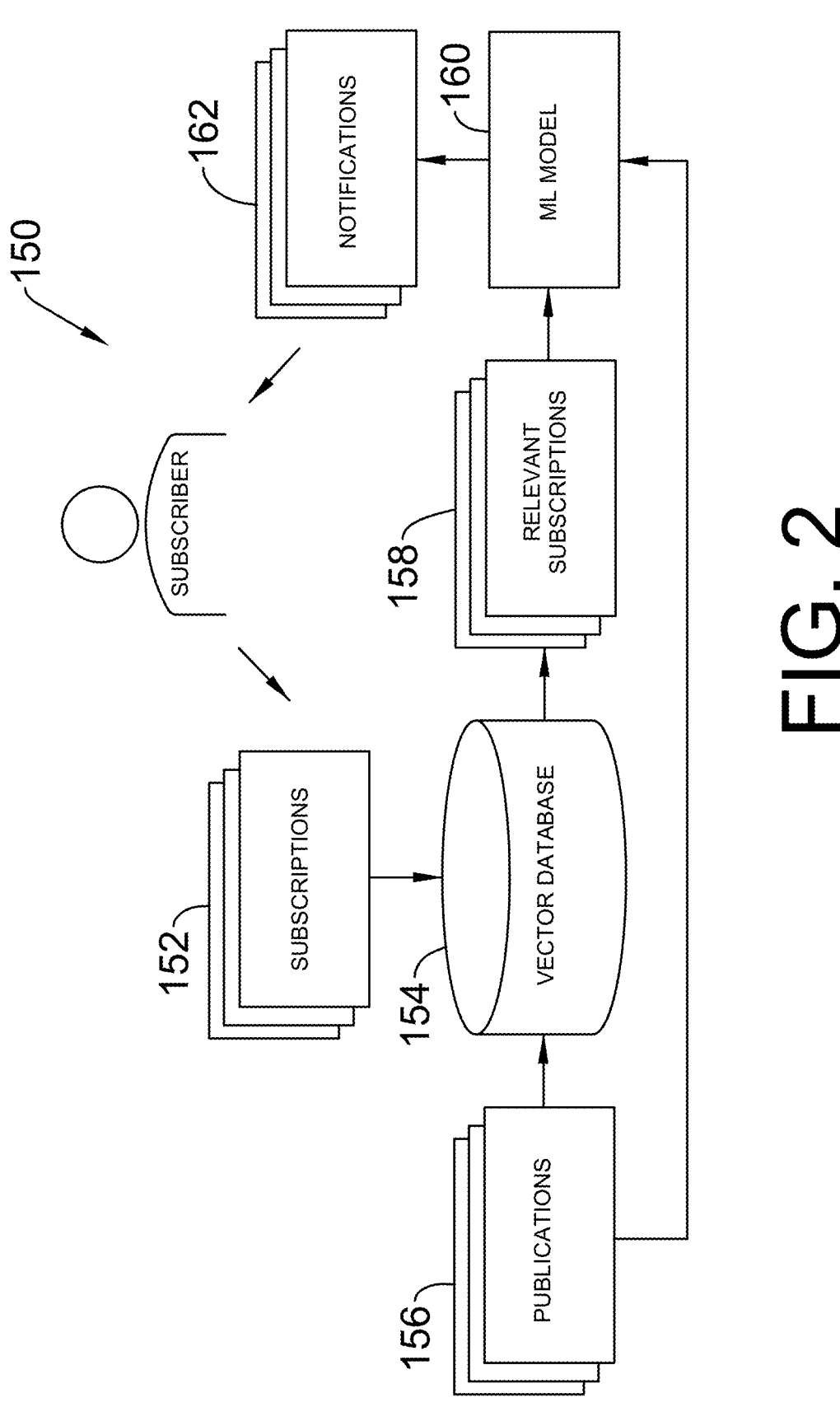
FIG. 2 is a conceptual representation of a computer system according to FIG. 1, consistent with illustrative embodiments.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

According to an aspect of the present disclosure, there is provided a computer-implemented method for optimizing publication and subscription expressiveness. To better understand the features of the present disclosure, it may be helpful to discuss known architectures. To that end, the following detailed description illustrates various aspects of the present disclosure by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, computing environment 100 includes an example of an environment for the execution of at least some of the computer code involved in performing the inventive methods, including a publication/subscription ("Pub/Sub") engine (or block) 101. In addition to block 101, computing environment 100 includes, for example, computer 102, wide area network (WAN) 103, end user device (EUD) 104, remote server 105, public cloud 106, and private cloud 107. In this embodiment, computer 102 includes processor set 110 (including processing circuitry 120 and cache 121), communication fabric 111, volatile memory 112, persistent storage 113 (including operating system 122 and block 101, as identified above), peripheral device set 114 (including user interface (UI) device set 123, storage 124, and Internet of Things (IoT) sensor set 125), and network module 115. Remote server 105 includes remote database 130. Public cloud 106 includes gateway 140, cloud orchestration module 141, host physical machine set 142, virtual machine set 143, and container set 144.

COMPUTER 102 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 102, to keep the presentation as simple as possible. Computer 102 may be located in a cloud, even though it is not shown in a cloud in FIG. 1. On the other hand, computer 102 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 102 to cause a series of operational steps to be performed by processor set 110 of computer 102 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 101 in persistent storage 113.

COMMUNICATION FABRIC 111 is the signal conduction path that allows the various components of computer 102 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 102, the volatile memory 112 is located in a single package and is internal to computer 102, but, alternatively or additionally, the volatile memory may be distributed over multiple packages and/or located externally with respect to computer 102.

PERSISTENT STORAGE 113 is any form of non-volatile storage for computers that is now known or to be developed in the future. The non-volatility of this storage means that the stored data is maintained regardless of whether power is being supplied to computer 102 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 101 typically includes at least some of the computer code involved in performing the inventive methods.

PERIPHERAL DEVICE SET 114 includes the set of peripheral devices of computer 102. Data communication connections between the peripheral devices and the other components of computer 102 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 102 is required to have a large amount of storage (for example, where computer 102 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 102 to communicate with other computers through WAN 103. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 102 from an external computer or external storage device through a network adapter card or network interface included in network module 115.

WAN 103 is any wide area network (for example, the internet) capable of communicating computer data over non-local distances by any technology for communicating computer data, now known or to be developed in the future. In some embodiments, the WAN 103 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 104 is any computer system that is used and controlled by an end user (for example, a customer of an enterprise that operates computer 102), and may take any of the forms discussed above in connection with computer 102. EUD 104 typically receives helpful and useful data from the operations of computer 102. For example, in a hypothetical case where computer 102 is designed to provide a recommendation to an end user, this recommendation would typically be communicated from network module 115 of computer 102 through WAN 103 to EUD 104. In this way, EUD 104 can display, or otherwise present, the recommendation to an end user. In some embodiments, EUD 104 may be a client device, such as thin client, heavy client, mainframe computer, desktop computer and so on.

REMOTE SERVER 105 is any computer system that serves at least some data and/or functionality to computer 102. Remote server 105 may be controlled and used by the same entity that operates computer 102. Remote server 105 represents the machine(s) that collect and store helpful and useful data for use by other computers, such as computer 102. For example, in a hypothetical case where computer 102 is designed and programmed to provide a recommendation based on historical data, then this historical data may be provided to computer 102 from remote database 130 of remote server 105.

PUBLIC CLOUD 106 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 106 is performed by the computer hardware and/or software of cloud orchestration module 141. The computing resources provided by public cloud 106 are typically implemented by virtual computing environments that run on various computers making up the computers of host physical machine set 142, which is the universe of physical computers in and/or available to public cloud 106. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 106 to communicate through WAN 103.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 107 is similar to public cloud 106, except that the computing resources are only available for use by a single enterprise. While private cloud 107 is depicted as being in communication with WAN 103, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 106 and private cloud 107 are both part of a larger hybrid cloud.

The computer 102 in some embodiments can be a computer server. The remote server 105 in some embodiments can represent multiple servers, which can provide machine learning resources and/or computer memory resources for the computer 102 and the Pub/Sub block 101.

Accordingly, the computer 102 has a specialized processing unit such as the Pub/Sub block 101 and the like for carrying out computations related to optimizing publication and subscription expressiveness. The computer system is thereby specifically configured to provide technical improvements to data systems, machine learning systems, artificial intelligence systems, and systems of data analysis systems such as but not limited to data classification systems, data regression systems, data batching and clustering systems, and the like. The computer system can further provide one or more inferences, provide one or more predictions, and/or determine one or more relationships among the data.

Machine learning ("ML"), and more generally artificial intelligence ("AI"), involves the development and use of computing systems that are configured to learn from data without need of explicit programming instructions. This science employs algorithms and statistics to analyze and inference from data values and patterns. ML constructs mathematical models ("ML models") that can make predictions about current and future events based on training data obtained from historical events. ML helps with downstream decision making, even with such downstream decision making that is automated.

The computer system and method of the present disclosure can employ any suitable ML based techniques, statistical-based techniques and/or probabilistic-based techniques. For example, the ML resources can employ expert systems, fuzzy logic, SVMs, Hidden Markov Models ("HMMs"), large language models ("LLMs"), greedy search algorithms, rule-based systems, Bayesian models, neural networks, other non-linear training techniques, data fusion, utility-based analytical systems, and the like. For example, the ML resources can perform a set of clustering ML computations, a set of logistic regression ML computations, a set of decision tree ML computations, a set of random forest ML computations, a set of regression tree ML computations, a set of least square ML computations, a set of instance-based ML computations, a set of support vector regression ML computations, a set of k-means ML computations, a set of spectral clustering ML computations, Gaussian mixture model ML computations, a set of regularization ML computations, a set of rule ML computations, a set of Bayesian ML computations, a set of deep Boltzmann computations, a set of deep belief network computations, a set of convolution neural network computations, a set of stacked auto-encoder computations and/or a set of different ML computations.

Accordingly, the computer system and method of this disclosure generally facilitates optimizing publication and subscription expressiveness in accordance with one or more embodiments illustratively described herein. For example, the computer system can be related to artificial neural network systems, an artificial intelligence system, a collaborative filtering system, a recommendation system, a signal processing system, a word embedding system, a topic model system, an image processing system, a data analysis system, a media content system, a video-streaming service system, an audio-streaming service system, an e-commerce system, a social network system, an internet search system, an online advertisement system, a medical system, an industrial system, a manufacturing system, and/or another digital system. The system can employ hardware and/or software to solve problems that are highly technical in nature, that are not abstract and that cannot be performed as a set of mental acts by a human.

For simplicity of explanation, the specialized-computer-implemented methods are depicted and described as a series of acts. It is to be understood and appreciated that the subject innovation is not limited by the acts illustrated and/or by the order of acts. That is, for example, acts can occur in various orders and/or concurrently, and with other acts not presented and described herein. Furthermore, not all expressly disclosed acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from a computer-readable device or storage media.

The system can employ hardware and/or software to solve problems that are highly technical in nature, that are not abstract and that cannot be performed as a set of mental acts by a human. One or more embodiments of the system can also provide technical improvements to a computer processing unit associated with a ML process by improving processing performance of the computer processing unit, reducing computing bottlenecks of the computer processing unit, improving processing efficiency of the computer processing unit, and/or reducing an amount of time for the computer processing unit to perform the ML process.

The following disclosure of illustrative embodiments demonstrates advancements in generative artificial intelligence ("AI"), such as ChatGPT™ and other LLMs, to advance the expressiveness of publish/subscribe systems to support natural language ("NL") queries over a continuous stream of unstructured computer content. NL documents are one example of publications contemplated herein. Updates of existing NL documents are another example of relevant publications. For example, an update to a Wikipedia article on the number of academy awards won by an actor could match a query by a subscriber interested in awards won by certain actors. Similarly, a stream of audio commentary of a tennis match could match a query by a subscriber wanting to be notified if a player gets into an argument while playing. An ongoing, continuously updated query is referred to as a "subscription" in this disclosure of illustrative embodiments. The present embodiments further contemplate customizing notifications sent to the subscribers, such as by using LLMs to generate NL answers specifically tailored to their respective subscriptions.

FIG. 2 conceptually depicts an architecture and methodology of a computer system 150 of these illustrative embodiments. A user (or "subscriber") issues one or more computerized queries for desired information 152, such as NL subscriptions. Subscriptions from one or more subscribers can be indexed in a vector database 154. Unstructured, multi-nodal publications 156 from different event sources can be matched against the indexed subscriptions in the vector space. When a publication 156 matches a subscription it becomes a relevant subscription 158, and as such that publication/subscription pair can be input to an ML model 160, such as an LLM. The ML model 160 can then generate a notification 162 to the subscriber based on the content of the publication 156 and the content of the relevant subscription 158. Distinguishable improvements of this computer system 150 over the state of publish/subscription art include both the publications 156 and the subscriptions 152 can be expressed in NL, and the notifications 162 can be customized for each subscription-publication pair rather than simplistically forwarding the matching publications to the subscriber.

In practicing illustrative embodiments, the nq_open dataset can be used consisting of real Google® queries and Wikipedia publications. A Chroma vector database can be used, such as by employing the all-MiniLM-L6-v2 model to compute embeddings of both the subscriptions 152 and the publications 156. Matched data pairs can be determined on the basis of any selected similarity threshold, such as but not limited to 0.8. Google's Flan-UL2 LLM and the LangChain Document QA can be employed to generate the notifications 162.

Figure 3:
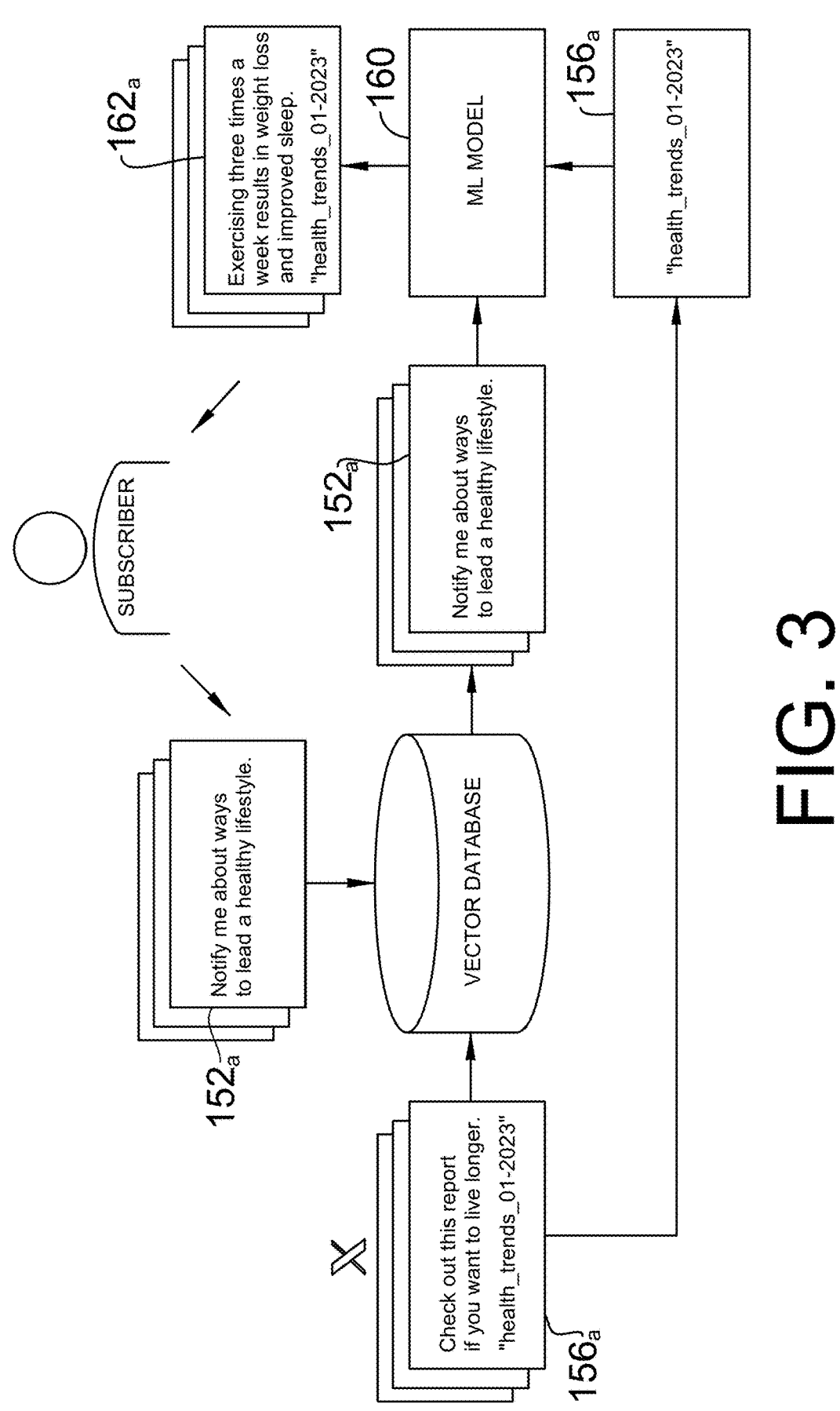
FIG. 3 is another conceptual representation of a computer system according to FIG. 1, consistent with illustrative embodiments.

In successful reductions to practice of these illustrative embodiments, the Google queries can be treated as the subscriptions 152 indexed in the vector database 154, and the Wikipedia® publications 156 can be presented to define comparative embeddings in the vector space. FIG. 3 depicts the computer system 150 of FIG. 2 with illustrative inputs and outputs. For example, a subscription $152_a$ can be "notify me about ways to lead a healthy lifestyle." An identified publication $156_a$ can be a published Tweet citing to an article in the January 2023 edition of a publication entitled "Health Trends." In this case, embedding can match the indexed subscription $152_a$ to the Tweet $156_a$ that states "check out this report if you want to live longer." Inputting the content of the cited publication $156_a$ and the content of the matching subscription $152_a$ (as a publication/subscription data pair) to the ML model 160 can generate not only a citation to the expressed publication ("health_trends_01-2023"), but also a targeted NL notification $162_a$ in terms of "exercising three times a week results in weight loss and improved sleep."

FIG. 4 depicts an illustrative case in which one expressed publication $156_{b-d}$ can match multiple indexed subscriptions $152_b$, $152_c$, $152_d$. It also depicts customized notifications $162_b$, $162_c$, $162_d$ that can be generated by pairing this one identified publication $156_{b-d}$ individually with each of the subscriptions $152_b$, $152_c$, $152_d$ as input pairs to the ML model 160. That is, the publication $156_{b-d}$ paired with both subscriptions $152_b$, $152_c$ can generate the same targeted notifications $162_b$, $162_c$ ("New York Yankees"), whereas the same publication $156_{b-d}$ paired with the other subscription $152_d$ can generate a different targeted notification $162_d$ ("Yes"). That is, generally, matching subscriptions 152 that express different queries can generate notifications of different expressions.

FIG. 5 depicts another illustrative case in which multiple publications $156_{e1}$, $156_{e2}$ match the same indexed subscription $152_e$, but each publication $156_{e1}$, $156_{e2}$ is only partially responsive to the information sought by subscription $152_e$. In this case, the notification $162_e$ can be algebraically derived by combining the two sub-notifications generated by individually pairing each of the publications $156_{e1}$, $156_{e2}$ with the same matching subscription $152_e$ as input pairs to the ML model 160.

In the case of FIG. 5, at a time when only one of the two publications $156e1$, $156e2$ has been expressed, the computer system 150 can be programmed to either generate a partially responsive notification or to wait until a fully responsive notification can be generated. In some cases, it can be advantageous to get a partial response sooner rather than later, and in other cases it can be advantageous to wait for a full response. Programming logic can be provided to manage the acquisition of a fully responsive notification in these circumstances. For example, subscriptions can be automatically analyzed to determine if a fully responsive notification involves a numeric quantity, such as the "2 parks" in the subscription $152_e$. The computer system 150 can thus identify and treat a notification as being only partially responsive until such time the identified publication (s) satisfy the numeric quantity requirement. For another example, multiple narrow subscriptions can be combined into an automatically generated broader subscription. That is, a first subscription "notify me about rainfall in Toronto" and a second subscription "notify me about rainfall in New York" can be combined in an automatically generated more general subscription "notify me about rainfall in North America."

Figure 6:
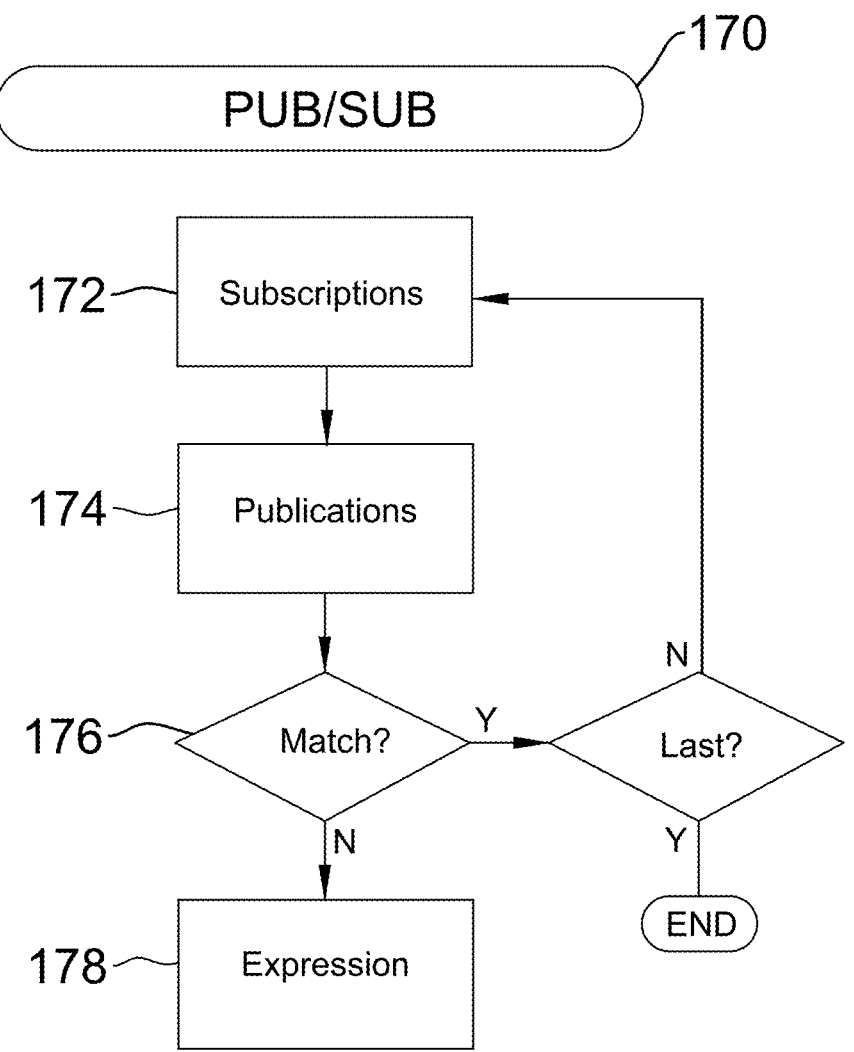
FIG. 6 is a flowchart depicting steps in a method for optimizing publication and subscription expressiveness, consistent with illustrative embodiments.

Generally, FIG. 6 is a flowchart depicting steps for practicing a computerized method 170 for optimizing publication and subscription expressiveness, consistent with illustrative embodiments. The method can begin in block 172 by establishing computerized subscriptions presenting respective queries for desired information. The types of computerized subscriptions are not limited in any way, they can include but are not limited to unstructured data in general, such as natural language data, video data, audio data, and the like. The computerized subscriptions can be indexed in a vector database.

Block 174 can identify computerized publications having published information. The types of computerized publications are not limited in any way, they can include but are not limited to unstructured data in general, such as natural language data, video data, audio data, and the like. Block 176 determines whether a computerized publication matches a computerized subscription. In one illustrative example, block 176 can compare a first embedding of the computerized publication in the vector database to a second embedding of the computerized subscription in the vector database. If the determination of block 176 is yes, then in block 178 an accurate and reliable expression of a query's desired information can be obtained. The expression can be obtained by algebraically combining the computerized publication and the computerized subscription to form a data pair for inferential learning, such as inputs to a large language model. This leaves open a possibility that a query's inferred expression can in some circumstances be only partially responsive to the query's desired information.

In some cases, two or more computerized publications can match the same computerized subscription. The computerized publications can be combined and then paired with the same computerized subscription to express any query's desired information. In some cases, the same computerized publication can match two or more computerized subscriptions. The computerized publication in that case can be individually paired with different computerized subscriptions to selectively obtain an individual expression for any query's desired information. The individual expressions can be the same or different.

Having read the disclosure of illustrative embodiments, the skilled artisan will ascertain the Pub/Sub block 101 beneficially improves the way a computer operates for purposes of publication/subscription matching and notifications. For example, without limitation, the computer system 150 embodying the Pub/Sub block 101 lowers the entry point to non-technical users by automatically performing the technical details of writing queries and formatting outputs.

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings. The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

It is to be appreciated that the computer system (e.g., the specialized computer 102, the Pub/Sub block 101, and/or the processing resources) performs acts in optimizing expressiveness that cannot be performed by a human (e.g., is greater than the capability of a single human mind). For example, an amount of data processed, a speed of processing of data and/or data types of the data processed over a certain period of time can be greater, faster and different than an amount, speed and data type that can be processed by a single human mind over the same period of time. The computer system can also be fully operational towards performing one or more other functions while also performing the above-referenced optimization of expressiveness. Moreover, ML output generated by computer system can include information that is impossible to obtain manually by a user. For example, an amount of information included in the ML output and/or a variety of information included in the ML output can be more complex than information obtained manually by a user.

Moreover, because at least machine learning optimization is established from a combination of electrical and mechanical components and circuitry, a human is unable to replicate or perform processing performed by the computer system (e.g., specialized computer 102, the Pub/Sub block 101, resources) disclosed herein. For example, a human is unable to communicate data and/or process data associated with the Pub/Sub block 101 for a given downstream task. Additionally, the specialized computer 102 significantly improves the operating efficiencies of the computer system by accurately optimizing publication and subscription expressiveness.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed:

1. A computer-implemented method for optimizing publication and subscription expressiveness, comprising:
   establishing a first computerized subscription presenting a first query from a subscriber for desired information;
   indexing the first computerized subscription in a vector database;
   identifying a first computerized publication having first published information;

determining that the first computerized publication matches the first computerized subscription by comparing a first embedding of the first computerized publication in the vector database to a second embedding of the computerized subscription in the vector database;
   upon the determination, combining the first computerized publication with the first computerized subscription as a first data pair for inferential learning, to be used as an input to a machine learning (ML) model;
   using the ML model to provide inferencing from the first data pair a first notification having an expression of the first query's desired information; and
   sending the notification to the subscriber.

2. The computer-implemented method of claim 1, wherein the first computerized subscription comprises a natural language ("NL") expression.

3. The computer-implemented method of claim 1, wherein the first computerized publication comprises a NL expression.

4. The computer-implemented method of claim 1, wherein the expression of the first query's desired information is partially responsive to the first query's desired information.

5. The computer-implemented method of claim 1, wherein the first computerized publication comprises at least one computerized expression comprising natural language data, video data, or audio data.

6. The computer-implemented method of claim 5, wherein the inferencing comprises representing the computerized expression in machine learning.

7. The computer-implemented method of claim 6, wherein the inferencing further comprises inputting the first data pair to a large language model.

8. The computer-implemented method of claim 1, further comprising:
   identifying a second computerized publication having second published information;
   determining that the second computerized publication matches the first computerized subscription;
   after the determining the second computerized publication matches the first computerized subscription, combining the first computerized publication with the second computerized publication; and
   inferencing from the combined computerized publications and the first computerized subscription an expression of the first query's desired information.

9. The computer-implemented method of claim 1, further comprising:
   establishing a second computerized subscription presenting a second query for desired information;
   determining that the first computerized publication matches the second computerized subscription;
   after the determining the first computerized publication matches the second computerized subscription, combining the first computerized publication with the second computerized subscription as a second data pair; and
   inferencing from the second data pair a second notification having an expression of the second query's desired information.

10. The computer-implemented method of claim 9, wherein the expression of the first query's desired information and the expression of the second query's desired information, are the same.

11. The computer-implemented method of claim 9, wherein the expression of the first query's desired information and the expression of the second query's desired information, are different.

12. A computer program product for optimizing publication and subscription expressiveness, the computer program product comprising a computer readable storage medium having program instructions embodied therewith, wherein an execution of the program instructions by a computer processor causes a computing device to:

establish a first computerized subscription presenting a first query from a subscriber for desired information;

index the first computerized subscription in a vector database;

identify a first computerized publication having first published information;

determine that the first computerized publication matches the first computerized subscription by comparing a first embedding of the first computerized publication in the vector database to a second embedding of the computerized subscription in the vector database;

upon the determining, combine the first computerized publication with the first computerized subscription as a first data pair for inferential learning, to be used as an input to a machine learning (ML) model;

using the ML model to inference from the first data pair a first notification having an expression of the first query's desired information; and send the notification to the subscriber.

13. The computer program product of claim 12, wherein the execution of the program instructions further causes the computing device to input the first data pair to a large language model.

14. The computer program product of claim 12, wherein the execution of the program instructions further causes the computing device to identify a second computerized publication having second published information;

determine that the second computerized publication matches the first computerized subscription;

after the determining the second computerized publication matches the first computerized subscription, combine the first computerized publication with the second computerized publication; and inference from the combined computerized publications and the first computerized subscription an expression of the first query's desired information.

15. The computer program product of claim 12, wherein the execution of the program instructions further causes the computing device to:

establishing a second computerized subscription presenting a second query for desired information;

determine that the first computerized publication matches the second computerized subscription;

after the determining the first computerized publication matches the second computerized subscription, combine the first computerized publication with the second computerized subscription as a second data pair; and inference from the second data pair a second notification having an expression of the second query's desired information.

16. A computer system for optimizing publication and subscription expressiveness, the computer system having a processor, a computer-readable memory, a computer-readable tangible storage device, and program instructions stored on the computer-readable tangible storage device for execution by a processor via the computer-readable memory, wherein the computer system is configured to perform a method, comprising:

establishing a first computerized subscription presenting a first query from a subscriber for desired information;

indexing the first computerized subscription in a vector database;

identifying a first computerized publication having first published information;

determining that the first computerized publication matches the first computerized subscription by comparing a first embedding of the first computerized publication in the vector database to a second embedding of the computerized subscription in the vector database;

upon the determination, combining the first computerized publication with the first computerized subscription as a first data pair for inferential learning, to be used as an input to a machine learning (ML) model;

using the ML model to provide inferencing from the first data pair a first notification having an expression of the first query's desired information; and sending the notification to the subscriber.

* * * * *